(12) United States Patent
Horsfall et al.

(10) Patent No.: US 8,864,619 B2
(45) Date of Patent: Oct. 21, 2014

(54) PLANETARY POWER TAKE OFF DEVICE

(75) Inventors: Stephen Daniel Horsfall, Auckland (NZ); John Loeffler, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 1218 days.

(21) Appl. No.: 12/579,787

(22) Filed: Oct. 15, 2009

(65) Prior Publication Data

US 2010/0099533 A1   Apr. 22, 2010

Related U.S. Application Data

(60) Provisional application No. 61/105,859, filed on Oct. 16, 2008.

(51) Int. Cl.
*F16H 3/44* (2006.01)
*B60K 17/28* (2006.01)
*F16H 3/54* (2006.01)

(52) U.S. Cl.
CPC ... *B60K 17/28* (2013.01); *F16H 3/54* (2013.01); *B60Y 2200/41* (2013.01)
USPC .......................................... 475/320; 475/322

(58) Field of Classification Search
USPC ........................ 475/207, 317, 320, 321, 322
See application file for complete search history.

(56) References Cited

U.S. PATENT DOCUMENTS

| | | | |
|---|---|---|---|
| 2,692,516 A | 11/1954 | O'Leary | |
| 2,747,416 A | 5/1956 | Swenson et al. | |
| 3,774,460 A | 11/1973 | Browning et al. | |
| 4,024,775 A | 5/1977 | Anderson et al. | |
| 4,043,227 A | 8/1977 | Beals et al. | |
| 4,074,581 A | 2/1978 | Stevens | |
| 4,420,992 A | 12/1983 | Windish | |
| 4,446,758 A | 5/1984 | Winzeler et al. | |
| 4,658,673 A | 4/1987 | Nerstad et al. | |
| 4,763,543 A | 8/1988 | Harada et al. | |
| 4,782,714 A | 11/1988 | Schletzbaum et al. | |
| 4,860,615 A * | 8/1989 | Huber et al. | 475/143 |
| 5,024,636 A * | 6/1991 | Phebus et al. | 475/141 |
| 5,159,855 A | 11/1992 | Nikolaus et al. | |
| 5,830,097 A | 11/1998 | Larkin | |
| 6,190,280 B1 | 2/2001 | Horsch | |
| 6,824,494 B2 * | 11/2004 | Yasuda et al. | 475/327 |

(Continued)

FOREIGN PATENT DOCUMENTS

EP   1146252 A1   10/2001
GB   886326   1/1962

*Primary Examiner* — Robert A Siconolfi
*Assistant Examiner* — Huan Le
(74) *Attorney, Agent, or Firm* — Renner, Otto, Boisselle & Sklar, LLP

(57) ABSTRACT

A power take off device includes input and output shafts and an integral planetary gear set. The power take off device may be a single speed or a two speed device. The input shaft and the output shaft are mechanically connected through the planetary gear set. In one mode of operation of the power take off device, a substantial speed reduction and torque increase is provided between the input shaft and the output shaft. The power take off device may change to a second mode of operation without stopping to provide a direct one to one speed and torque ratio between the input shaft and the output shaft. A planetary gear set clutch unit includes a two direction actuator that provides fluid pressure actuation and release of the clutch unit with a single input signal.

17 Claims, 6 Drawing Sheets

(56) References Cited

U.S. PATENT DOCUMENTS

| | | |
|---|---|---|
| 7,282,003 B2 * | 10/2007 | Klemen et al. ............ 475/5 |
| 7,354,369 B2 | 4/2008 | Hasegawa et al. |
| 7,357,745 B2 | 4/2008 | Hidaka et al. |
| 7,384,361 B2 * | 6/2008 | Tabata et al. ............ 475/215 |
| 7,537,536 B2 * | 5/2009 | Hvolka et al. ............ 475/146 |
| 7,798,027 B2 * | 9/2010 | Paul et al. ............ 74/15.86 |
| 2003/0073534 A1 * | 4/2003 | Oshidari et al. ............ 475/5 |
| 2007/0191169 A1 * | 8/2007 | Fujita et al. ............ 475/207 |

* cited by examiner

PLANETARY POWER TAKE OFF DEVICE

CROSS REFERENCE TO RELATED APPLICATIONS

The present application claims the benefit of the filing date of U.S. Provisional Patent Application Ser. No. 61/105,859, filed Oct. 16, 2008, the disclosure of which is incorporated herein by reference in its entirety.

TECHNICAL FIELD

The present invention relates to a power take off device that supplies power from a power source to a driven accessory. More specifically, the invention relates to a power take off device with an integral planetary gear set and at least one clutch that provides power at various output speeds to the driven accessory.

BACKGROUND OF THE INVENTION

Power take off devices are commonly used with power sources such as vehicle engines or motors or vehicle transmissions to provide power to a driven accessory. For example, power take off devices are commonly used on farm tractors to provide power to accessories such as mowers or other accessories, on highway vehicles to provide power to accessories such as winches or pumps or blowers, on industrial equipment to provide power to pumps and blowers and other accessories, and on marine vehicles to provide power to pumps and propulsion devices and other accessories.

A typical power take off device can include a housing, an input gear that extends out of the housing, and an output shaft that also extends out of the housing. When the power take off device is mounted to a source of rotational power, the input gear meshes with and is driven by a drive gear that is driven by the power source. The input gear is directly or indirectly drivingly connected to the output shaft within the housing to transmit power from the input shaft to the output shaft. An accessory is drivingly connected to the output shaft and in turn is powered by the power source. The power take off device may provide a constant speed ratio or a speed reduction or a speed increase between the input gear and the output shaft and may include a clutch to engage and disengage the drive connection between the input gear and the output shaft.

In certain uses of power take off devices, it would be advantageous to provide two or more speed ratios rather than a single constant speed ratio between the input gear and the output shaft. For example, when a power take off device is used to propel a blower, it would be advantageous for the power take off device to provide a gear reduction that provides relatively lower speed and relatively greater torque of the output shaft to overcome the relatively high inertia forces of the blower at start up. Once the blower has reached a particular rotational speed, it would be advantageous for the power take off device to increase the speed of the output shaft and of the blower. This two ratio or two stage or two speed approach could reduce the stress on a clutch within the power take off device during such start up of the blower. Another application in which it would be advantageous for the power take off device to rotate the output shaft first at a slower speed and then at a faster speed is when the power take off device is used to power a winch. In this application, it would be advantageous to rotate the winch at a greater speed when the winch cable is being played out to reach a load and to then rotate the winch at a slower speed with increased torque to retrieve the load.

It would also be advantageous in certain uses of power take off devices to provide a large speed reduction gear ratio between the input gear and the output shaft while achieving a small compact size. For example, in many uses of power take off units on vehicle transmissions, the space available for the power take off unit is limited, yet it can be desirable to provide a large speed reduction gear ratio that provides a correspondingly large torque increase. In conventional power take off units it can be difficult to achieve a large speed reduction gear ratio while achieving a compact size. This is because a large speed reduction gear ratio can require at least one relatively large diameter gear that has a longitudinal axis laterally offset relative to the axis of a small gear that drives the large gear.

As used herein, a power take off device means a mechanical or mechanical—fluid device that transmits power directly or indirectly from a power source to a driven accessory. A removable power take off device is a power take off device that has releasable fasteners that removably connect the device to the power source. A transmission mounted power take off device is a power take off device that is mounted to a transmission that transmits power from a primary power source such as a motor or engine of a vehicle to a primary powered device such as the propulsion component of the vehicle, in a manner such that the power take off device transmits power from the primary power source through the transmission to the driven accessory independently of transmission of power to the primary powered device.

SUMMARY OF THE INVENTION

The present invention provides a power take off device, a removable power take off device, and a transmission mounted or transmission mounted removable power take off device that can provide single speed operation, two speed operation, or three or more speed operation. The invention provides such a power take off device in which an input gear, an output device and a planetary gear set that includes a sun gear, a carrier with associated planet gears, and a ring gear are all provided in an integral unitary structure.

The invention also provides such a device that includes one or more clutches and can change the speed ratio without stopping the rotational movement of the input gear or of the output device. The invention in one embodiment provides a two speed output capability that may for example have a direct drive 1:1 ratio and a speed reduction or speed increaser. The invention in another embodiment provides a single speed output that has an extended range of reduction ratios or speed increase ratios. The invention provides a compact power take off unit in which the input shaft and output shaft and planetary gear set have the same longitudinal axis, to decrease the lateral size requirements of the power take off device. The planetary gear set in conjunction with a cluster gear set at the input of the power take off unit provides a wide choice of output speed and torque ranges, so that the power take off device can be used in a wide variety of different applications with different requirements by changing just a few components. The invention also provides a clutch/brake unit actuator that provides fluid pressure actuation and fluid pressure release of the unit with a single control signal. Further, the invention provides various ones of the features and structures described in the claims set out below, alone and in combination, which claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
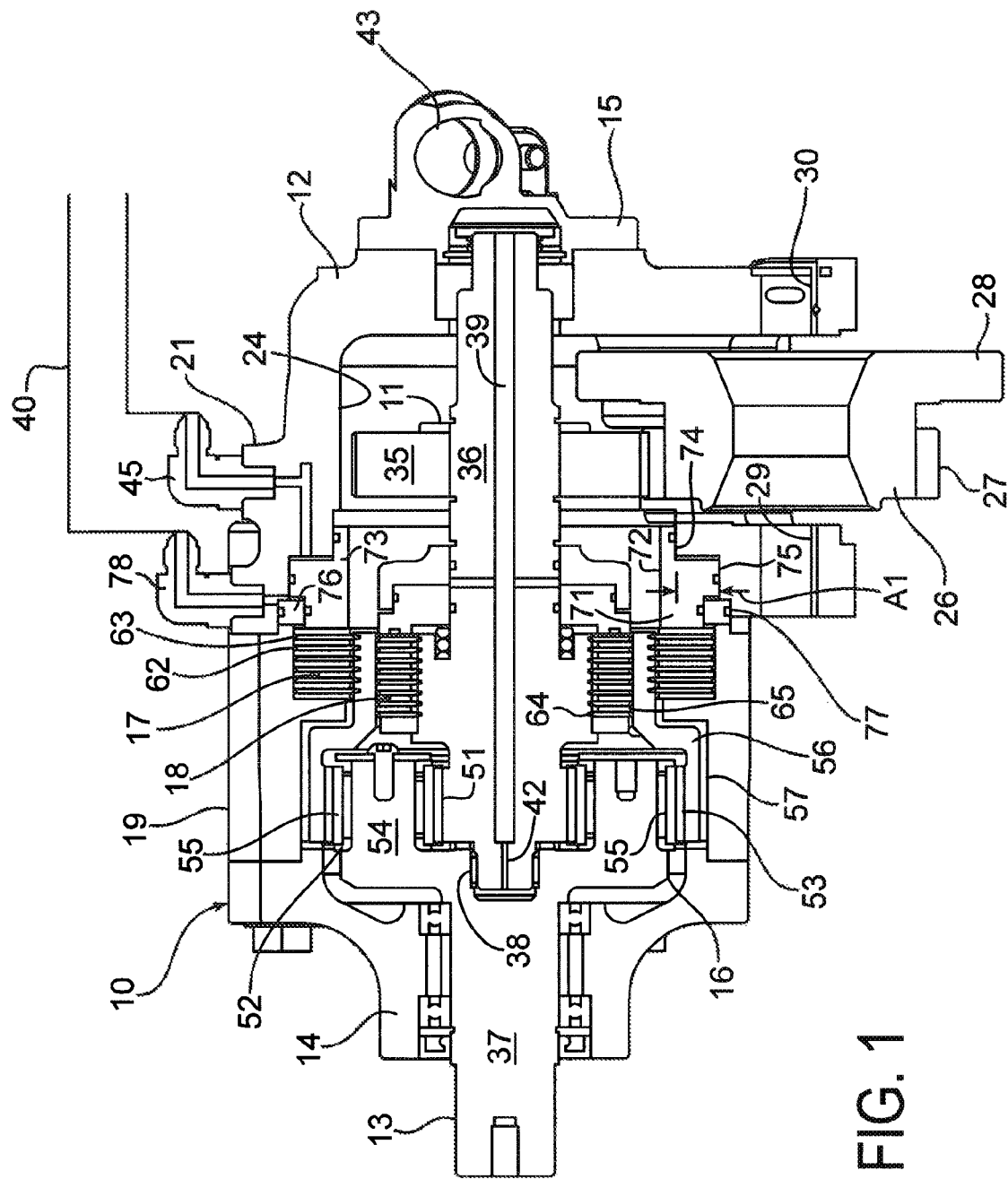
FIG. 1 is a longitudinal cross-sectional side elevation view of a presently preferred embodiment of a power take off device incorporating certain principles of this invention, in which a two speed power take off device is provided.
Figure 2:
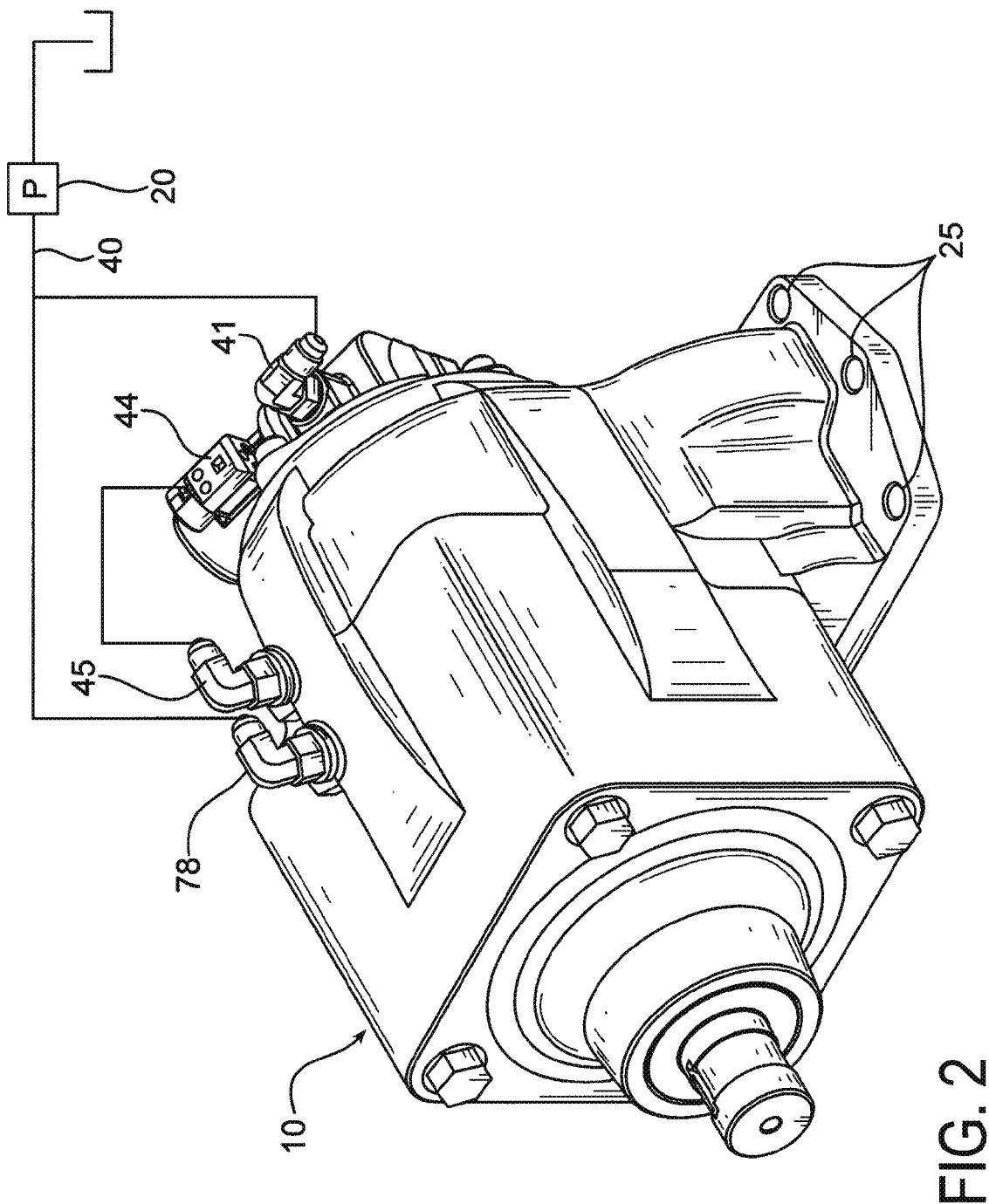
FIG. 2 is a perspective view of the power take off device shown in FIG. 1.

A preferred embodiment of the present invention is shown in FIGS. 1 and 2. A power take off device 10 includes an input drive 11, an input housing 12, an output drive 13, an output housing 14, an end cap 15, a planetary gear set 16, planetary gear set wet clutch/brake units 17 and 18, and a planetary housing 19. A pump 20 provides a source of fluid pressure for lubricating the power take off device 10 and for controlling the operation of the power take off device 10. The housings 12, 14 and 19 and the end cap 15 are separate components, but some may be integral with one another and together they provide a unitary housing 21 for the power take off device 10 that has a unitary outer surface and a unitary inner surface with the inner surface defining a unitary central opening or cavity. As used herein, unitary means integral, or separate but connected together without relative movement, and providing a functional single structure In the preferred embodiment, the power take off device 10 is removably mounted by bolts to a transmission of an internal combustion engine powered over the highway truck to drive a blower that is mounted on the truck to pull leaves and other debris from a street into a container mounted on the truck. The engine of the truck also powers the pump 20. The over the highway truck, engine, transmission, mounting bolts, blower and container are further described below and are not illustrated in the drawings. Alternatively, the power take off device 10 may be adapted for mounting to a motor or engine or other prime mover or to a transmission of a truck or tractor or industrial vehicle or marine vehicle or stationary unit or other rotational power source.

The input housing 12 includes a central opening 24 (FIG. 1) and bolt holes 25 (FIG. 2) that receive the bolts for securing the power take off device 10 to the transmission mentioned above of the over the highway truck on which the power take off device 10 is used. The input drive 12 includes an input cluster gear 26 that is partially disposed in the central opening 24. The cluster gear 26 includes a larger diameter gear 27 and a smaller diameter gear 28 mounted on an idler shaft (not shown) that extends between idler shaft support bushings 29 and 30 in the input housing 12.

The cluster gear 26 can be removed from the input housing 12, and the smaller diameter gear 28 can removed from the larger diameter gear 27, to change the input gear ratios of the power take off device 10 in a well known manner. The input gear cluster 26, and particularly the input gear 27, extends laterally out of the input housing 12 and meshes with a drive gear (not shown) of the transmission of the over the highway truck to which the power take off unit 10 is removably attached. In this manner, rotational torque and power from the engine of the truck is transmitted to the power take off device 10 through the truck transmission independently of the speed and direction of travel of the truck. The input drive 11 also includes a transfer gear 35 that is fixed to and transfers torque and power to an input shaft 36 from the gear 27. The input shaft 36 is rotatably journaled at its right end in a bearing in the end cap 15.

The output drive 13 includes an output shaft 37 that is rotatably journaled in the output housing 14. The left end of the output shaft 37 is connected to rotatably drive the above described blower. The output shaft 37 also includes a blind bore 38 that includes a bushing into which the left end of the input shaft 36 is rotatably journaled. A longitudinal passage 39 in the input shaft 36 receives fluid from the pump 20 through the line 40 and fitting 41 (FIG. 2), and a reduced diameter orifice 42 at the left end of the passage 39 provides fluid to lubricate the bushing in the blind hole 38.

The end cap 15 includes a blind hole that carries a bearing for supporting the right end of the input shaft 36. The end cap 15 also includes a threaded port on its exterior surface that receives the fluid fitting 41 and an opening 43 for on its exterior surface that receives a solenoid valve 44. The solenoid valve 44 is shown in FIG. 2 but is removed in FIG. 1 for clarity. The solenoid valve 44 is a well known device and includes an electrical solenoid (not shown) that is powered by an electrical signal to open and close fluid communication between the fitting 41 and a fitting 45.

The planetary gear set 16 includes a sun gear 51, a planet gear set 52, and a ring gear 53. The sun gear 51 has a pitch diameter S. The sun gear 51 is carried on and fixed to the left end of the input shaft 36, so that the sun gear 51 is driven by and rotates with the input shaft 36. The planet gear set 52 includes a planet carrier 54 that is integrally formed on the output shaft 37, so that the output shaft 36 rotates with the planet carrier 54. The planet carrier 54 carries four individual planet gears 55, each of which is rotatably journaled on the planet carrier 54 and two of which are shown in FIG. 1. Each planet gear 55 meshes with both the sun gear 51 and the ring gear 52, in a well known manner. The ring gear 53 has a pitch diameter R and is fixed to and rotates with a ring gear hub 56. The ring gear hub 56 is rotatably journaled in a ring gear bushing 57 in the planetary housing 19, so that the ring gear 53 and ring gear hub 56 are rotatably disposed in the housing 19.

Figure 6:
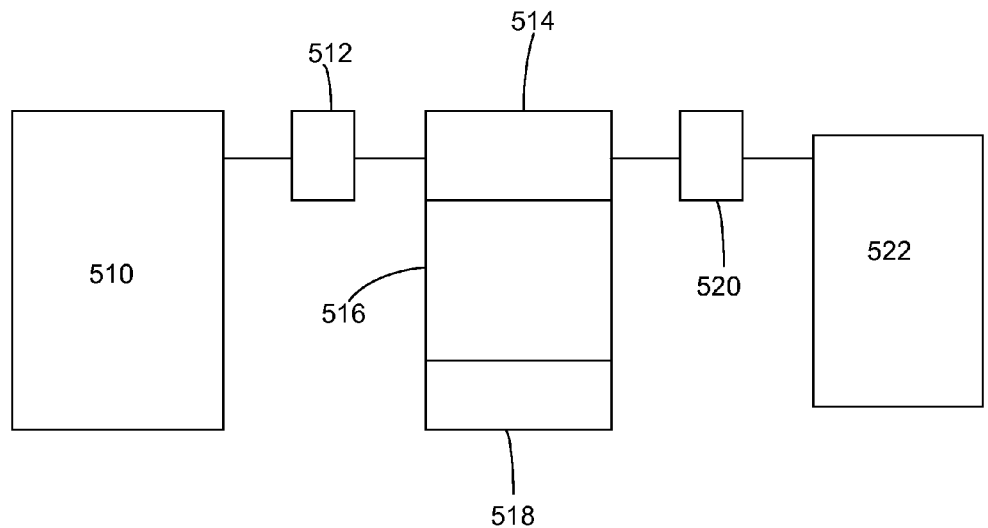
FIG. 6 is a schematic diagram of a first clutch connecting a sun gear to a housing and a second clutch connecting the sun gear to an input gear.
Figure 7:
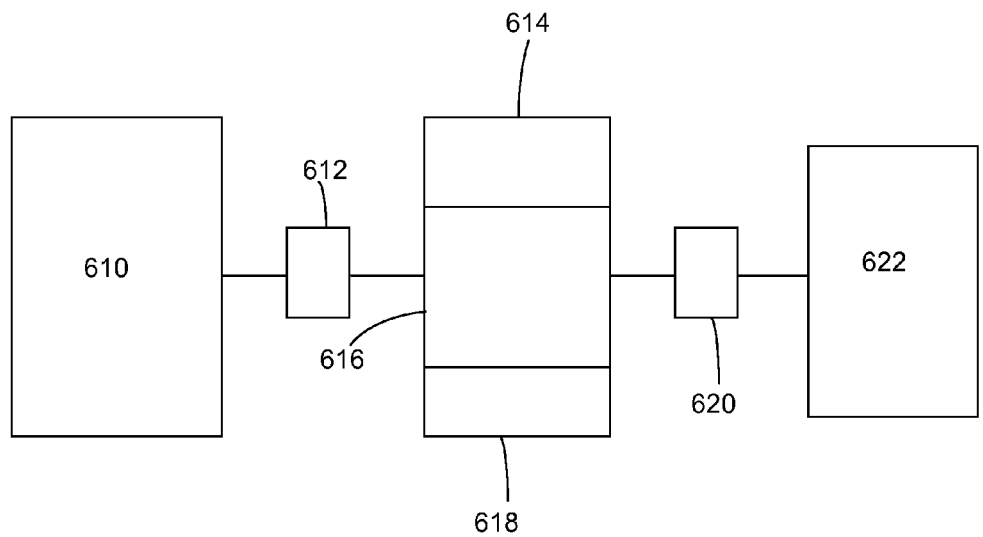
FIG. 7 is a schematic diagram of a first clutch connecting a planet carrier to a housing and a second clutch connecting the planet carrier to an input gear.

The planetary gear set wet clutch/brake unit 17 includes a first set of generally flat laterally extending plates 62 each fixed to and carried by the planetary housing 19 and a second set of similar generally flat laterally extending plates 63 disposed between adjacent ones of the plates 62 and each fixed to and carried by the ring gear hub 56. When the unit 17 is released, the first set of plates 62 and the second set of plates 63 are free to rotate with respect to one another. This permits relative rotational movement between the housing 19 and the ring gear hub 56 and ring gear 53. When the unit 17 is actuated, the first set of plates 62 and the second set of plates 63 engage one another and preclude relative rotational movement between the housing 19 and the ring gear hub 56 and ring gear 53. In an embodiment, a housing 510 may be connected through a clutch 512 to a sun sear 514 as shown in FIG. 6, where the sun ear 514 be connected to a planet carrier 516 that ma be connected to a ring gear 518. In another embodiment, a housing 610 ma be connected through a clutch 612 to a planet carrier 616 as shown in FIG. 7, where the planet carrier 616 may be connected to a sun gear 614 and may be connected to a ring gear 618. A conventional multi-plate wet clutch/brake unit 17 is shown and described, but alternatively any other type of clutch/brake unit can be used in place of the multi-plate units described above and below herein. For example, a band type clutch/brake unit might be used that includes a band that can be tightened about a rotating member and an actuator. The term clutch or clutch unit herein refers to any device that moves between one position that permits relative rotational movement and another position that limits or precludes relative rotational movement between first and second members, whether such members are stationary or rotatable. The term brake or brake unit herein refers to any device that moves between one position that permits relative rotational movement and another position that limits or precludes relative rotational movement between first and second members, wherein one such member is rotatable and the other such member is stationary.

The planetary gear set wet clutch unit 18 includes a first set of generally flat laterally extending plates 64 each fixed to and carried by the input shaft 36 and a second set of similar generally flat laterally extending plates 65 disposed between adjacent ones of the plates 64 and each fixed to and carried by the ring gear hub 56. When the unit 18 is released, the first set of plates 62 and the second set of plates 63 are free to rotate with respect to one another. This permits relative rotational movement between the input shaft 36 and the ring gear hub 56 and ring gear 53. When the unit 18 is actuated, the first set of plates 64 and the second set of plates 65 engage one another and preclude relative rotational movement between the input shaft 36 and the ring gear hub 56 and ring gear 53. In an embodiment, the sun gear 514 may be connected through a clutch 520 to an input rear 522 as shown in FIG. 6. In another embodiment, the planet carrier 616 may be connected through a clutch 620 to an input ear 622 as shown in FIG. 6.

Actuation and release of the clutch unit 18 is controlled by fluid pressure in the longitudinal passage 39. The pressure in the passage 39 is communicated to the end face of the actuator piston 71 by a lateral passage in the input shaft 36. When fluid pressure from the pump 20 through line 40 and fitting 41 is communicated to the longitudinal passage 39 and actuator piston 71, the unit 18 is engaged. When this fluid pressure is isolated from the passage 39 and actuator piston 71, the unit 18 is released in a well known manner.

Actuation and release of the clutch unit 17 is controlled by a two area actuator 73 that provides fluid pressure actuation and fluid pressure release of the unit 17 with a single control signal. The actuator 73 has a relatively large annular lateral cross sectional area A1 exposed to control fluid pressure from the pump 20 through the fitting 45. The control fluid pressure to the fitting 45 is controlled by the solenoid valve 44. The annular lateral cross sectional area A1 is the difference between the lateral cross sectional area of a first machined bore 74 in the central opening 24 in the input housing 12 in which a first portion of the actuator 73 is slidably and sealingly received and a second larger diameter stepped machined bore 75 in the opening 24 in which a larger diameter portion of the actuator 73 is slidably and sealingly received. The actuator 73 also includes a stationary spacer 76 that is secured between a third larger diameter stepped machined bore 77 in the central opening 24 of the input housing 12 and the planetary housing 19. The actuator 73 is slidably and sealingly received in the inside diameter of the stationary spacer 76, and the actuator 73 has a lateral cross sectional area exposed to fluid pressure from the pump 40 through a fitting 78. The lateral cross sectional area A1 of the actuator 73 that is intermittently exposed to control fluid pressure from the solenoid valve 44 is significantly larger than the lateral cross sectional area of the actuator 73 that is constantly exposed to substantially the same fluid pressure from the pump 20 through the fitting 78. When the fluid control signal from the solenoid 44 is provided to the area A1, the actuator 73 is pushed to the left and actuates the unit 17 to stop rotational movement of the ring gear hub 56 and ring gear 57 relative to the housing 19. When the fluid control signal from the solenoid 44 is released and the pressure acting against area A1 is reduced, the actuator 73 is pushed to the right by the fluid pressure from the pump 20 through the fitting 78. In this manner, the actuator 73 is moved in opposite directions to actuate and release the unit 17 using only a single control signal.

Referring still to FIGS. 1 and 2, the mechanical input received by the input gear 28 is transmitted through the planetary gear set 16 to the output shaft 37. When the unit 17 is released and the unit 18 is actuated, the sun gear 51 and the ring gear 53 are linked together. This provides a 1:1 ratio of relative movement between the input shaft 36 and the output shaft 37. When the unit 17 is actuated and the unit 18 is released, the ring gear 53 is stationary. This provides a gear ratio of 1+R/S, which produces a substantial speed reduction and torque increase. When both units 17 and 18 are released, the power take off unit is in a neutral mode and torque and power from the input shaft 36 is not transmitted to the output shaft 37. When both units 17 and 18 are actuated, the power take off unit is locked against rotational movement of either the input shaft 36 or the output shaft 37.

When the power take off unit 10 is mounted on an over the highway truck transmission and used to drive a large blower (or fan), the gear of the transmission that meshes with the input gear 28 of the power take off unit 10 rotates the input shaft 36. With both units 17 and 18 disengaged, the power take off unit is in neutral and the blower is not driven. When the unit 17 is actuated and the unit 18 remains released, the ring gear hub 56 and ring gear 53 are grounded to the housing 19. In this mode, the input shaft 36 drives the sun gear 38 and the planet carrier 54 rotates the output shaft 37. This provides the rotational speed reduction ratio of 1+R/S for the output shaft 37 relative to the input shaft 36, to overcome the inertial forces of the blower at start up. When the blower has reached sufficient speed with this ratio, the power take off unit 10 is changed to a second speed ratio. The unit 17 is released and the unit 18 is actuated. In this mode, the sun gear 51 and the ring gear 53 are linked together resulting in a 1:1 ratio of relative rotational movement between the input shaft 36 and the output shaft 37. This provides a relatively faster speed than the first mode to drive the blower at its appropriate operating speed.

With this structure, the input drive 11 and planetary drive 16 and output drive 13 are all arranged along a single longitudinal axis to reduce bulk and provide a compact power take off unit with multiple speed ratios. Further the clutch units 17 and 18 are coaxially arranged in a nested relationship (one laterally disposed inside the other, in substantial laterally aligned relationship) in which both units provide engagement and disengagement of the ring gear relative to other elements of the power take off unit 10.

Figure 3:
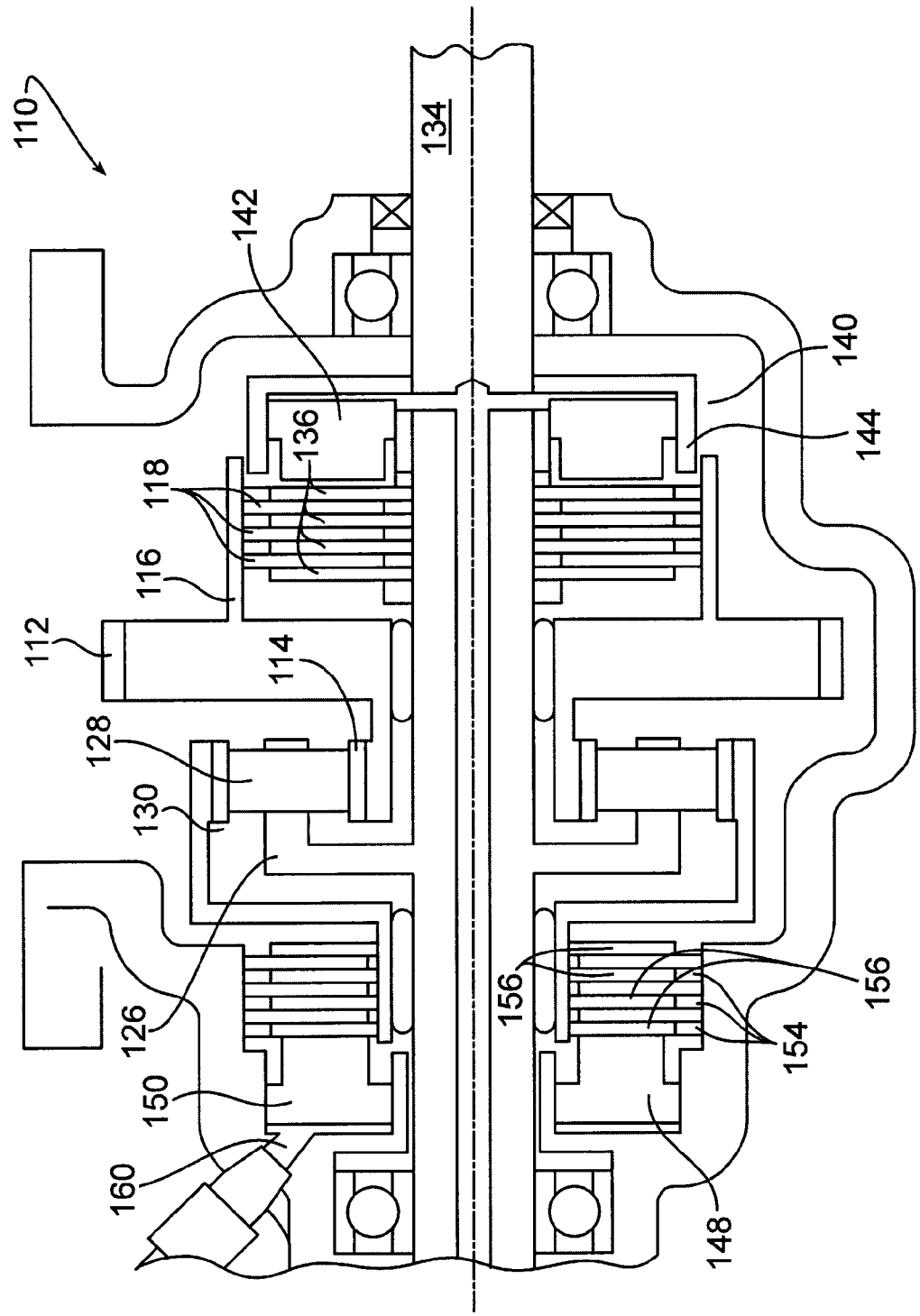
FIG. 3 is a longitudinal cross-sectional side elevation view of an alternative embodiment of a power take off device incorporating certain principles of this invention, in which a two speed power take off device is provided.

Referring now to FIG. 3, a second embodiment of a two speed planetary power take off device 110 is shown. The power take off device 110 is illustrated as having a single input gear 112 that is driven by a transmission. Those skilled in the art will recognize that additional gears, i.e., cluster gears as shown if FIGS. 1 and 2, may be used for inputting power into the power take off device 110. In FIG. 3, the input gear 112 has a portion that forms the sun gear of the planetary gear set, hereinafter, the sun gear 114. The input gear 112 also includes an annular portion 116 for supporting clutch plates 118.

The planetary gear set also includes a carrier 126 for supporting planet gears 128 and a ring gear 130. The carrier 126 is fixedly attached to, or alternatively is integral to, the output shaft 134 of the power take off device 110. A plurality of clutch plates 136 is attached to the output shaft 134 in a location associated with clutch plates 118. Clutch plates 118 and 136 for portions of a wet clutch 140 that is actuated by movement of a clutch piston 142 in a clutch cylinder 144. Fluid pressure passing through passages in the output shaft 134 causes movement of the piston 142 toward the clutch disks 118 and 136 to engage the clutch 140. Generally, a resilient member, such as a spring, is used to disengage the clutch 140 when the fluid pressure acting on the piston 142 is reduced below a predetermined amount.

The power take off device 110 of FIG. 3 is a two speed (two ratio) power take off device. Although described as providing a reduction function, the gearing could alternatively provide an overdrive function depending upon which portion of the planetary gear set is grounded. During operation of the device 110, if clutch 140 is engaged and brake 148 is disengaged, the device 110 provides a 1:1 ratio and the input gear 112 directly drives the output shaft 134 through the clutch 140. If, however, clutch 140 is disengaged and brake 148 is engaged, the power take off device 110 provides a reduction equal to 1+R/S (where R is the pitch diameter of the ring gear 130 and S is the pitch diameter of the sun gear 114) through the planetary gear set with sun gear 114 driving the carrier 126 and the ring gear 130 being grounded.

Figure 4:
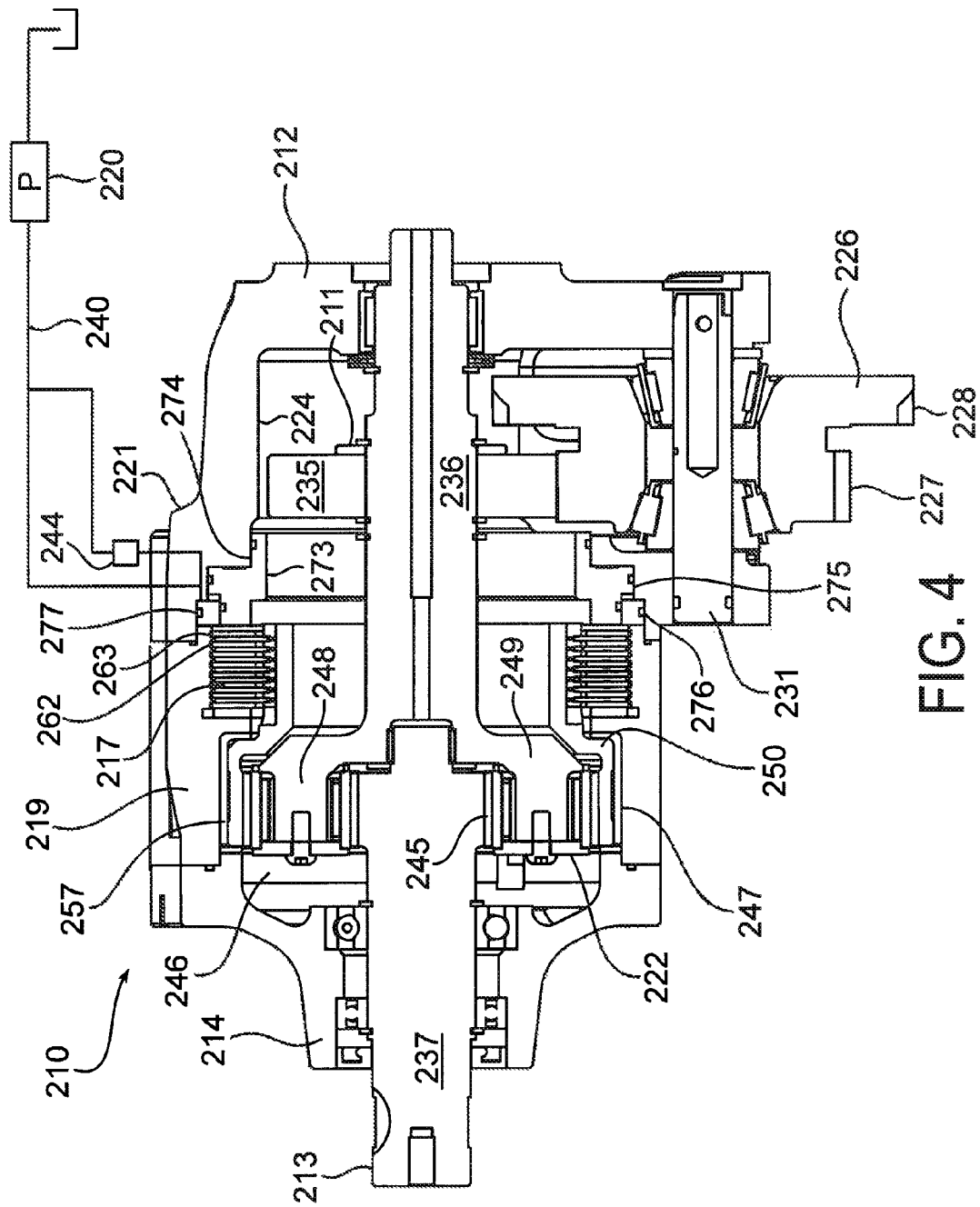
FIG. 4 is a longitudinal cross-sectional side elevation view of another alternative embodiment of a power take off device incorporating certain principles of this invention, in which a single speed power take off device is provided.

FIG. 4 illustrates another embodiment of a planetary power take off device 210 according to certain features of the present invention. The power take off device 210 is a single speed planetary power take off device in which a coaxial input shaft, output shaft and planetary gear set provide a speed increase and a corresponding torque decrease in a compact size. The single speed power take off device 210 shown in FIG. 4 is similar in many respects to the two speed power take off device 10 shown in FIGS. 1 and 2 and described above, except that (a) the single speed power take off device 210 has only one clutch/brake unit as described below while the two speed power take off device 10 has two clutch/brake units, and (b) the single speed power take off device 210 provides a speed increase (overdrive) gear ratio as opposed to the 1:1 direct drive ratio and the speed reduction ratio provided by the two speed power take off device 10. The power take off device 210 could alternatively be arranged to provide a speed reduction and torque increase function, by arranging the stationary and rotating gears of the planetary gear set in a manner similar to that shown in FIGS. 1 and 2. Component parts of the power take off device 210 and circuit that are structurally and/or functionally similar to component parts described above with reference to FIGS. 1 and 2 are identified below by the same reference number as used in describing FIGS. 1 and 2 above, with the addition of a prefix "2." For brevity, the description above pertaining to these component parts and circuit of FIGS. 1 and 2 is not fully repeated below, but such description above applies to FIG. 4 unless otherwise mentioned below or otherwise illustrated in FIG. 4.

In the embodiment shown in FIG. 4, the power take off device 210 is also removably mounted by bolts to a transmission of an internal combustion engine powered over the highway truck. The engine of the truck also powers a pump 220, and the device 210 is preferably mounted in a circuit similar to that shown in FIG. 2 and described above. Alternatively, the power take off device 210 may be adapted for mounting to a motor or engine or other prime mover or to a transmission of a truck or tractor or industrial vehicle or marine vehicle or stationary unit or other rotational power source.

Referring still to FIG. 4, the power take off device 210 includes an input drive 211, an input housing 212, an output drive 213, an output housing 214, a planetary gear set 222, a planetary gear set wet clutch/brake unit 217, and a planetary housing 219. The input housing 212 includes a central opening 224 and bolt holes (not shown) that receive bolts for securing the power take off device 210 to the transmission mentioned above of the over the highway truck on which the power take off device 10 is used. The input drive 212 includes an input cluster gear 226 that is partially disposed in the central opening 24. The cluster gear 26 includes a larger diameter gear 227 and a smaller diameter gear 228 mounted on an idler shaft 231. The input drive 211 also includes a transfer gear 235 that is fixed to and transfers torque and power to an input shaft 236 from the gear 227. The input shaft 36 is rotatably journaled at its right end in a bearing in the end cap 15.

The output drive 213 includes an output shaft 237 that is rotatably journaled in the output housing 214. The left end of the output shaft 237 is connected to rotatably drive the above described blower.

A solenoid valve 244 is a well known device and includes an electrical solenoid (not shown) that is powered by an electrical signal to open and close fluid communication from the line 240.

The planetary gear set 222 includes a sun gear 245, a planet gear set 246, and a ring gear 247. The sun gear 245 has a pitch diameter S. The sun gear 245 is carried on and fixed to the right end of the output shaft 237, so that the sun gear 245 drives and rotates with the output shaft 237. The planet gear set 246 includes a planet carrier 248 that is integrally formed on the input shaft 236, so that the input shaft 236 drives and rotates with the planet carrier 248. The planet carrier 248 carries four individual planet gears 249, each of which is rotatably journaled on the planet carrier 248 and two of which are shown in FIG. 4. Each planet gear 55 meshes with both the sun gear 245 and the ring gear 247, in a well known manner. The ring gear 247 has a pitch diameter R and is fixed to and rotates with a ring gear hub 250. The ring gear hub 250 is rotatably journaled in a ring gear bushing in the planetary housing 219, so that the ring gear 247 and ring gear hub 250 are rotatably disposed in the housing 219.

The planetary gear set wet clutch/brake unit 217 includes a first set of generally flat laterally extending plates 262 each fixed to and carried by the planetary housing 219 and a second set of similar generally flat laterally extending plates 263 disposed between adjacent ones of the plates 262 and each fixed to and carried by the ring gear hub 250. When the unit 217 is released, the first set of plates 262 and the second set of plates 263 are free to rotate with respect to one another. This permits relative rotational movement between the housing 219 and the ring gear hub 250 and ring gear 247 to provide a neutral mode. When the unit 217 is actuated, the first set of plates 262 and the second set of plates 263 engage one another and preclude relative rotational movement between the housing 219 and the ring gear hub 250 and ring gear 247. In this mode, the ring gear 247 is grounded while the planet carrier 248 rotates with the input shaft 236, to provide an increased speed of the output shaft 237 relative to the input shaft 236 at a speed ratio equal to 1/(1+S/R).

Actuation and release of the clutch unit 217 is controlled by a two area actuator 273 that provides fluid pressure actuation and fluid pressure release of the unit 217 with a single control signal. The actuator 273 has a relatively large annular lateral cross sectional area exposed to control fluid pressure from the pump 220 controlled by the solenoid valve 244. The annular lateral cross sectional area is the difference between the lateral cross sectional area of a first machined bore 274 in the central opening 224 in the input housing 212 in which a first portion of the actuator 273 is slidably and sealingly received and a second larger diameter stepped machined bore 275 in the opening 224 in which a larger diameter portion of the actuator 273 is slidably and sealingly received. The actuator 273 also includes a stationary spacer 276 that is secured between a third larger diameter stepped machined bore 277 in the central opening 224 of the input housing 212 and the planetary housing 219. The actuator 273 is slidably and sealingly received in the inside diameter of the stationary spacer 276, and the actuator 273 has a lateral cross sectional area exposed to fluid pressure from the pump 40. The lateral cross sectional area of the actuator 273 that is intermittently exposed to control fluid pressure from the solenoid valve 244 is significantly larger than the lateral cross sectional area of the actuator 273 that is constantly exposed to substantially the same fluid pressure from the pump 220. The actuator 273 operates in a similar manner to the operation of the actuator 73 described above with reference to FIGS. 1 and 2.

Figure 5:
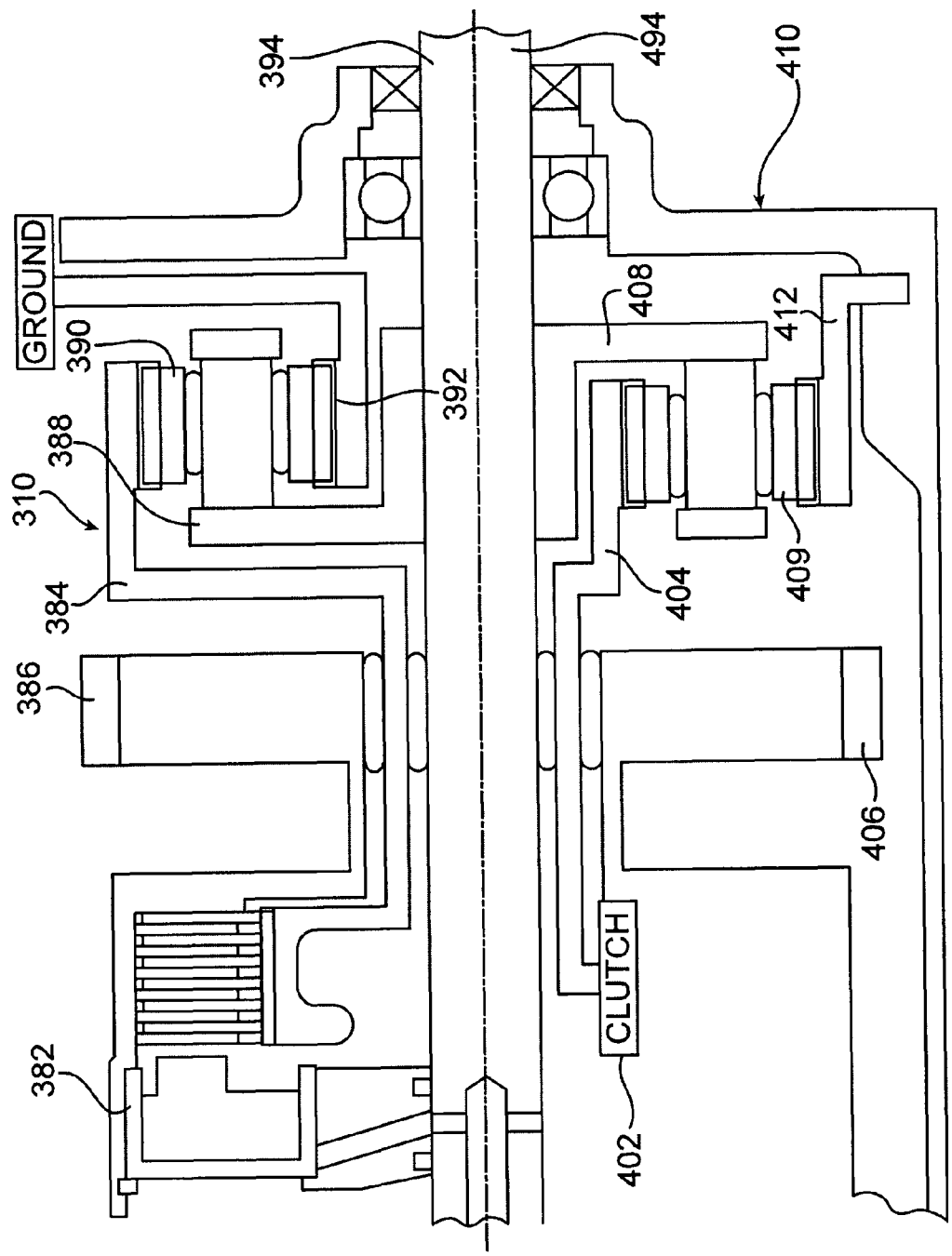
FIG. 5 is a longitudinal cross-sectional side elevation view of two other alternative embodiments of a power take off device incorporating certain principles of this invention, in which a single speed power take off device is provided.

FIG. 5 illustrates two additional embodiments of power take off devices 310 and 410 according to the present invention. For ease of understanding, power take off devices 310 and 410 are both illustrated in FIG. 5 and are separated from one another by the central axis of the output shaft 394.

The power take off device 310 shown in the upper half of FIG. 5 includes a clutch 382, similar to that described above with regard to clutch 140. When engaged, clutch 382 connects the ring gear 384 of the planetary gear set to the input gear 386. The carrier 388 for the planet gears 390 is fixed for rotation with the output shaft 394, while the sun gear 392 is grounded (or fixed relative to the housing of the power take off device 310). The power take off device 310 is a single speed (single ratio) power take off device. When clutch 382 is engaged, the input gear 386 drives the ring gear 384, which, in turn, drives the carrier 388 for causing rotation of the output shaft 394. This design provides a medium reduction.

The power take off device 410 shown in the lower half of FIG. 5 includes a clutch 402 that is similar to clutch 140. When engaged, clutch 402 connects the sun gear 404 of the planetary gear set to the input gear 406. The carrier 408 for the planet gears 409 is fixed for rotation with the output shaft 494, while the ring gear 412 is grounded (or fixed relative to the housing of the power take off device 410). Power take off device 410 is a single speed power take off device. When clutch 402 is engaged, the input gear 406 drives the sun gear 404, which, in turn, drives the carrier 408 for causing rotation of the output shaft 494. This design provides a deeper reduction (equal to 1+R/S) relative to that shown in the upper half of FIG. 5, where R is the pitch diameter of the ring gear 412 and S is the pitch diameter of the sun gear 404.

The power take off devices 10, 110, 210, 310 and 410 may each be modified to provide various input shaft to output shaft speed and torque ratios and/or to provide a clutch function through their respective planetary gear sets in various arrangements. For example, a clutch may be used between and among other ones of the rotating parts to facilitate starting and stopping the output shaft while the input shaft continues to rotate. Also, a clutch may be used between and among the housings, sun gears, planet carriers and ring gears to provide various speed and torque ratios. If any two of the sun gears, planet carriers and ring gears of any of the planetary gear sets of any of the power take off devices 10, 110, 210, 310 and 410 are locked together (permanently or through a clutch) while the other is not locked, the respective planetary gear set will provide a 1:1 speed ration between the input shaft and the output shaft. Also, if the input shaft of any planetary gear set is locked to the sun gear (with pitch diameter S) and the output shaft is locked to the planet carrier while the ring gear (with pitch diameter R) is stationary in any of the embodiments, the speed ratio will be a reduction of 1+R/S (as in the embodiments shown in FIGS. 1 and 2, 3 and the lower half of FIG. 5). If the input shaft is locked to the planet carrier and the output shaft is locked to the ring gear while the sun gear is stationary, the speed ratio will be a speed increase of 1/(1+S/R). If the input shaft is locked to the sun gear while the output shaft is locked to the ring gear and the planet carrier is stationary, the speed ration will be a reduction with the output direction reversed of −R/S. The various embodiments of the invention shown and described above, with or without any of these modifications or changes, provides a compact, universal, integral planetary power take off device with relatively small lateral dimensions that will provide a wide variety of large and small speed and torque ratios with a minimum number of parts.

Presently preferred embodiments of the invention are shown and described in detail above. The invention is not, however, limited to these specific embodiments. Various changes and modifications can be made to this invention without departing from its teachings, and the scope of this invention is defined by the claims set out below.

What is claimed is:
1. A power take off device comprising:
  a housing, said housing having an outer surface and an inner surface, said inner surface defining a central cavity, and a plurality of openings extending from said outer surface to said inner surface to provide access to said central cavity,
  an input gear, said input gear being disposed in one of said plurality of openings, at least a portion of said input gear being disposed within said central cavity, and at least a portion of said input gear being disposed outside said central cavity outwardly of said outer surface,
  an output device, said output device being disposed in another one of said plurality of openings, and at least a portion of said output device being disposed outside said central cavity outwardly of said outer surface, and
  an intermediate gear set disposed entirely within said central cavity and mechanically connecting said input gear and said output device, said intermediate gear set including a planetary gear set,
  said planetary gear set including a sun gear, a plurality of planet gears carried by a planet carrier, and a ring gear;
  a first clutch for connecting a first one of said sun gear and said planet carrier and said ring gear with said input gear, and a second clutch for connecting a second one of said sun gear and said planet carrier and ring gear to said housing, wherein the output device is driven in a first direction when the first clutch is engaged, and the output device is driven in the first direction when the second clutch is engaged.

2. A power take off device as set forth in claim 1, wherein at least one of said first and second clutches includes first and second clutch surfaces and a movable actuator arranged to move said clutch surfaces between an engaged position and a disengaged position.

3. A power take off devide as set forth in claim 2, wherein said actuator is slidably disposed in said housing, said actuator includes a first sealed annular cross sectional area facing in one longiudinal direction and a second sealed annular cross sectional area facing in a second longitudinal direction opposite said first direction, and said second area being substantially smaller than said first area.

4. A power take off device as set forth in claim 1, wherein each of said clutches includes a longitudinal axis, said axes are coaxial, and one of said clutches is disposed laterally inwardly of and is substantially laterally aligned with the other of said clutches.

5. A power take off device as set forth in claim 4, wherein the other of said clutches includes first and second clutch surfaces and a movable piston arranged to move said clutch surfaces between an engaged position and a disengaged position, the piston having opposite first and second end surfaces respectively having first and second areas communicating with respective first and second fluid pressure passages, and said first area is substantially larger than said second area.

6. A power take off device as set forth in claim 1, including an input shaft driven by said input gear, said output device including an output shaft, said input shaft and said output shaft and said planetary gear set each having a longitudinal axis, and said longitudinal axes each being coaxial with one another.

7. A power take off device as set forth in claim 6, wherein at least one of said first and second clutches includes first and second clutch surfaces and a movable actuator arranged to move said clutch surfaces between an engaged position and a disengaged position.

8. A power take off device as set forth in claim 7, wherein said housing and said outer surface and said central opening are each unitary.

9. A power take off device as set forth in claim 8, wherein at least one of said first and second clutches includes first and second clutch surfaces and a movable actuator arranged to move said clutch surfaces between an engaged position and a disengaged position.

10. A power take off device as set forth in claim 1, wherein the power take off device is a two speed device.

11. A power take off device as set forth in claim 10, wherein each of said clutches includes a movable actuator arranged to move said clutch between an engaged position and a disengaged position.

12. A power take off device as set forth in claim 11, wherein each of said clutches includes a longitudinal axis, said axes are coaxial, and one of said clutches is disposed laterally inwardly of and is substantially laterally aligned with the other of said clutches.

13. A power take off device as set forth in claim 12, including an input shaft driven by said input gear, said output device including an output shaft, said input shaft and said output shaft and said planetary gear set each having a longitudinal axis, and said longitudinal axes all being coaxial.

14. A power take off device as set forth in claim 13, wherein one of said clutches acts between said ring gear and said housing, and the other of said clutches acts between said ring gear and another rotatable element within said housing.

15. A power take off device as set forth in claim 14, wherein said housing and said outer surface and said central opening are each unitary.

16. A system comprising:
a prime mover power source;
a primary powered device;
a transmission including at least one transmission gear and mechanically connecting said prime mover power source and said primary powered device to transmit rotational torque from said prime mover power source to said primary powered device;
an accessory device;
and a transmission mounted power take off device;
said power take off device including;
a unitary housing, said housing having a unitary outer surface and a unitary inner surface, said inner surface defining a unitary central cavity, and a plurality of openings extending from said outer surface to said inner surface to provide access to said central cavity;
an input gear, said input gear being disposed in one of said openings, at least a portion of said input gear being disposed within said central cavity, and at least a portion of said input gear being disposed outside said central cavity outwardly of said outer surface and engaging said transmission gear;
an output device, said output device being disposed in another one of said openings, and at least a portion of said output device being disposed outside said central cavity outwardly of said outer surface and mechanically connected to said accessory device;
and an intermediate gear set disposed entirely within said central cavity and mechanically connecting said input gear and said output device, said intermediate gear set including a planetary gear set;
said planetary gear set including a sun gear, a plurality of planet gears carried by a planet carrier, and a ring gear;
a first clutch for connecting a first one of sun gear and said planet carrier and said ring gear with said input gear, and a second clutch for connecting a second one of said sun gear and said planet carrier and ring gear to said housing;
an input shaft and an output shaft each having a longitudinal axis;
said planetary gear set having a longitudinal axis;
and said longitudinal axes being coaxial,
wherein the output device is driven in a first direction when the first clutch is engaged, and the output device is driven in the first direction when the second clutch is engaged.

17. A system as set forth in claim 16, wherein said first and second clutches each has a longitudinal axis, said longitudinal axes of said clutches being coaxial with said other longitudinal axes, one of said clutches being nested within the other of said clutches, and said clutches being substantially laterally aligned with one another.

* * * * *